United States Patent [19]

Goltermann et al.

[11] Patent Number: 5,728,307
[45] Date of Patent: Mar. 17, 1998

[54] METHOD OF EMPTYING THE PRESS CHAMBERS OF A PRESS FILTER AND AN APPARATUS THEREFOR

[75] Inventors: Jörgen Goltermann, Vordingborg, Denmark; Hans-Göran Hedlund, Sala, Sweden

[73] Assignee: Sala International AB, Sala, Sweden

[21] Appl. No.: 532,137

[22] Filed: Sep. 22, 1995

[30] Foreign Application Priority Data

Sep. 22, 1994 [SE] Sweden .................................. 9403179

[51] Int. Cl.⁶ ............................................. B01D 25/32
[52] U.S. Cl. ............................................. 210/791; 210/225
[58] Field of Search ................................. 210/224, 225, 210/791; 100/198

[56] References Cited

U.S. PATENT DOCUMENTS 3,289,844 12/1966 Emele .
4,197,203 4/1980 Wilms ................................ 210/225

FOREIGN PATENT DOCUMENTS 0052810 6/1982 European Pat. Off. .
0208899 1/1987 European Pat. Off. .
67513 6/1981 Japan ................................ 210/225
59-38806 9/1984 Japan .

Primary Examiner—Robert J. Popovics
Attorney, Agent, or Firm—Nils H. Ljungman and Associates

[57] ABSTRACT

The present invention relates to a method pertaining to press filters of the kind which include a plurality of press plates that can be brought towards and into mutual abutment and pairs of which form therebetween at least one pressure chamber, wherein there is formed in each pressure chamber as the aqueous suspension of solid particles is dewatered a filter cake which upon completion of the dewatering process is released from the chamber by separating the press plates so that the chamber will empty itself of its contents. The method is characterized in that emptying of the pressure chambers is achieved by permitting each press plate to rotate freely and swing about an axis which extends generally horizontally through the plane of the plate, under the influence of the released filter cake. The press filter is constructed so that each press plate is able to pivot in relation to the rails. The pulling devices by means of which the press plates are separated are attached to only one single coupling device on each side of each press plate, this coupling device being placed on or in the immediate vicinity of the runner means, in other words in the proximity of the horizontal rail.

17 Claims, 4 Drawing Sheets

METHOD OF EMPTYING THE PRESS CHAMBERS OF A PRESS FILTER AND AN APPARATUS THEREFOR

BACKGROUND OF THE INVENTION

1. Field of the Invention

The present invention relates to a method and to an arrangement pertaining to press filters of the kind which include a plurality of press plates which can be brought towards and into mutual abutment and pairs of which define a press chamber therebetween, wherein when dewatering an aqueous suspension of solid particles, the solid particles will form a filter cake in each press chamber, wherein the filter cake is released upon completion of a dewatering operation by separating the press plates so as to empty the press chambers.

2. Background of the Invention

Press filters of this kind have long been known to the art. One general problem encountered with such press filters has resided in the inability to obtain a sufficiently long cycle time, by which is meant the time between two consecutive dewatering operations.

Originally, the pressure chambers in the press filters were emptied one at a time, which naturally resulted in comparatively long emptying times. Our earlier Patent Specifications U.S. Pat. No. 4,900,454 and U.S. Pat. No. 5,133,884 describe in relation to press filters methods and arrangements which enable all filter chambers to be emptied generally at the same time, and which also deal with problems concerning the release of the filter cakes from the press chambers. These patent specifications are incorporated in the present document by way of reference, and describe in detail the manner in which such a press filter operates and its construction. The last-mentioned patent specification proposes a method in which the filter cakes are caused to loosen from the filter cloths, by lifting the runners that carry the filter cloths and allowing the runners to fall against stationary abutment surfaces so as to subject the filter cloths to sudden acceleration forces, and/or by subjecting the filter cloths to shear forces by moving the lower part of the filter cloths sideways in the direction of the plane of the cloths.

However, release of a filter cake from its respective chamber may also become problematic even with a press filter of the aforedescribed kind, as the filter cake is loosened it may first loosen in the upper part of the filter chamber and therewith cause the loosened filter cake to collapse or slide downwards while fastening at the lower end of the press chamber, or while building a "bridge" at said lower end, so as to prevent the filter cake from leaving the filter or at least delaying its vacation. It is therefore necessary to take these problems into account when constructing press filters, in which construction the distances between the fully extended or separated plates will be sufficiently large to prevent such disturbances, or at least to reduce the frequency at which such disturbances occur. In practice, a compromise is made between anticipated disturbances in operation and filter capacity, this compromise greatly limiting the possibility of increasing the productivity of the filters per unit of volume, since the number of press chambers per unit length of filter is restricted by the distance between the open press plates occasioned by the aforesaid reasons, and since the risk of operational disturbances cannot be fully eliminated.

OBJECT OF THE INVENTION

One object of the invention is to provide a method which will solve the problem of emptying the press chambers of loosened filter cakes in a surprisingly simple and effective manner. The method enables both older press filters and new filters to be readily modified so that productivity will be increased substantially in comparison with the productivity achieved with those filters at present commercially available.

SUMMARY OF THE INVENTION

To this end, the invention is characterized by the steps and the features defined in the following claims. In accordance with the inventive method, the filter cake will leave its respective press chambers by virtue of each press plate being able to rotate freely about a generally horizontal axis and swing in a direction through the plane of the plate, under the influence of a loosened filter cake. The horizontal position of the axis of each press plate is preferably located on or in the close proximity of an imaginary horizontal line that passes through the centre of gravity of the press plate.

The press filter is of the kind which includes a plurality of press plates that can be brought towards and away from abutment with one another and pairs of which define therebetween at least one press chamber, and in which each press plate is provided or connected with runner means which slide, roll or otherwise move on horizontally extending rails, and coupling devices for the attachment of pressplate separating devices. Each press plate of the inventive press filter is pivotal in a position of rest on the horizontal rails. The pulling devices which function to separate the press plates from one another are mounted on one single coupling device on each side of each press plate, this coupling device being positioned on or in the immediate vicinity of the runner means, i.e. in the vicinity of the horizontal rail.

The runner means is conveniently positioned on generally the same horizontal level as the centre of gravity of the press plate, or slightly above this level. The pulling device on respective sides of each press plate has the form of a chain or a link system which is attached to the single coupling devices of all press plates. In the simplest case, the press plate is able to pivot about an imaginary axis on the slide surface of the runner means, which in the case of the illustrated embodiment a curved shape, for instance a circular shape, to facilitate pivoting of the press plate. Alternatively, the construction may be such as to cause the plate to pivot relative to a runner means that has a horizontal slide surface, for instance by providing a circular pivot pin which rests rotatably in a corresponding recess in a runner means which has the form of a bearing cup. It will be understood that other structural variations which will permit the plate to swing freely lie within the scope of the invention. Because the plate-pulling devices of the inventive press filter are attached to one single coupling device on each side of each press plate in the vicinity of the runner means and the rail, the pulling devices will not prevent the plates from swinging freely during a filter emptying procedure, or even impede such movement, as is the case when the plate-pulling devices are arranged in pairs on both sides of the rail in hitherto known press filters.

BRIEF DESCRIPTION OF THE DRAWINGS

The invention will now be described in more detail with reference to the accompanying drawings, in which.

DESCRIPTION OF THE PREFERRED EMBODIMENT

Figure 1:
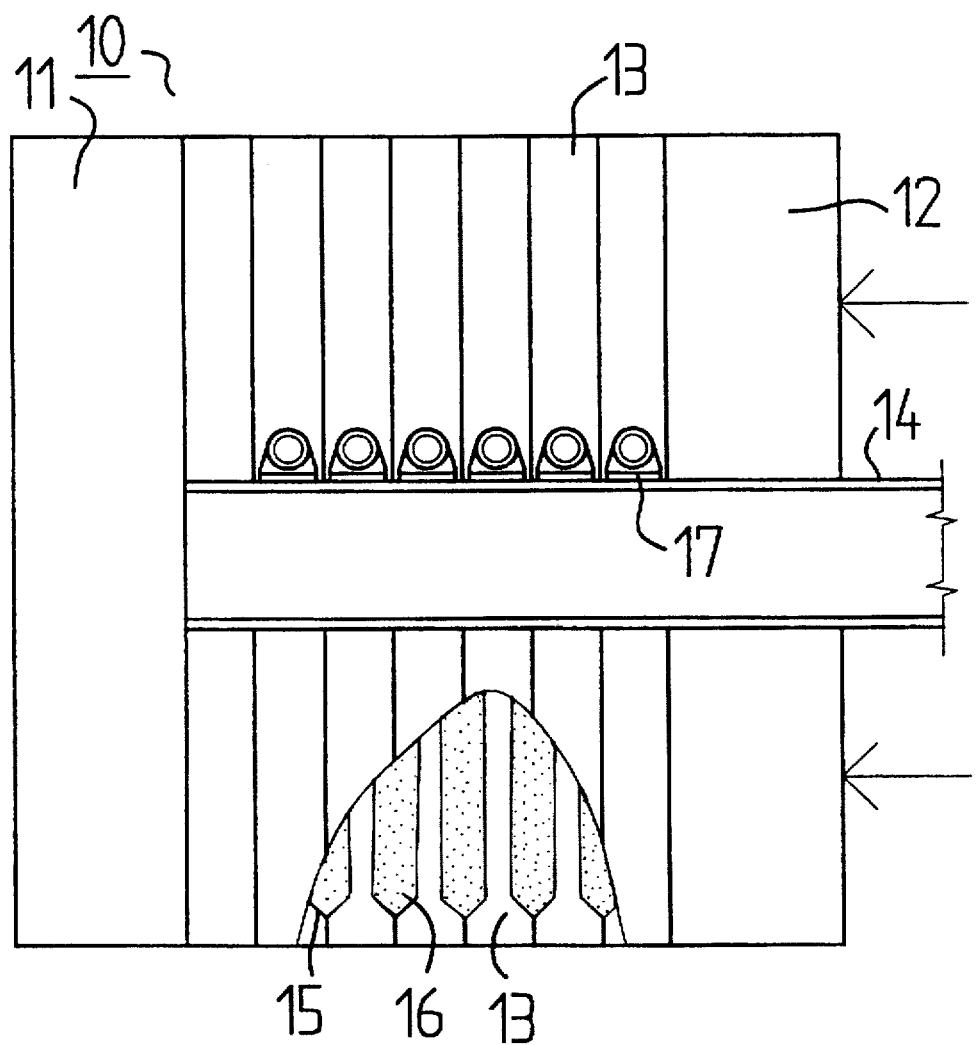
FIG. 1 is a principle side view of a filled press filter.

FIG. 1 is a principle illustration of a press filter 10 having a fixed end plate 11 and a movable end plate 12. Located between the end plates are a number of press plates 13, which because the filter 10 is assumed to be full are shown in abutment with one another. As indicated by the arrows pointing left in the Figure, the movable end plate 12 presses the press plates 13 together so that the plates will lie tightly against one another, there being formed a pressure chamber 15 between each pair of press plates 13—13. In this operational state, the press filter 10 is filled with an aqueous suspension of solid particles, by introducing the suspension under pressure into respective press chambers 15 and causing the suspension liquid to pass through filter cloths and out to drainage channels (not shown) in the press plates 13 and to outlet conduits (not shown) connected to said plates. The solid particles in the suspension form a filter cake 16 in each press chamber. The movable end plate 12 and each pressure plate 13 rests on horizontal rails 17 mounted on respective sides of the plates.

Figure 2:
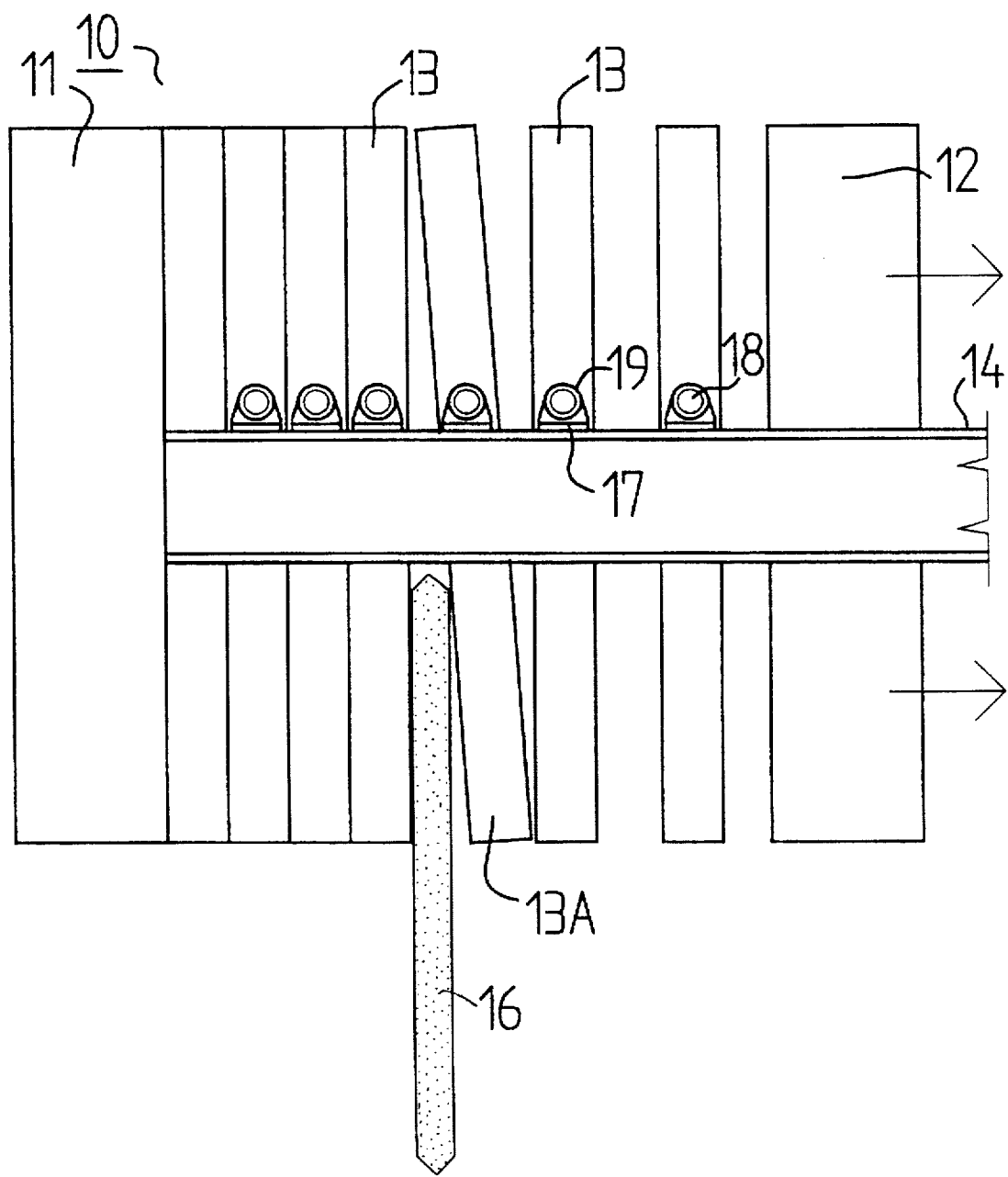
FIG. 2 is a view corresponding to that of FIG. 1 but shows the filter during an emptying stage.

FIG. 2 illustrates the press filter 10 of FIG. 1 as the press chambers 15 are emptied. In this stage, the movable end plate 12 is moved away from the press plates 13, as indicated by the arrows pointing to the right in the Figure. Because the press plates 13 are connected to one another by pulling devices and because the plate proximal to the movable end plate 12 is also connected thereto, for instance with the aid of chains or linkage means attached to one single coupling device 19 on each side of the plates, the press plate 13 will be caused to move outwards in succession, i.e. will move in the direction of movement of the movable end plate 12. Each press chamber 15 will therewith be empty sequentially from the right to the left in the Figure. When the opening defined by two mutually adjacent press plates 13 becomes sufficiently large, the filter cake 16 present in the press chamber 15 defined by these plates 13 will loosen. As the filter cake loosens, there is established a downwardly and outwardly acting force on the press plates 13 defining the pressure chamber 15. As a result of this pressure, the lower part of the chamber 15 will endeavour to widen. This widening of the lower part of the chamber 15 is achieved by virtue of the released cake causing the press plate, reference 13A and shown to the right in the Figure, to pivot or swing about a horizontal axis 18 located in the proximity of the centre of gravity of the plate or immediately thereabove. The press plate 13A will thus tend to pivot anti-clockwise about its pivot axis 18 under the influence of the weight of the filter cake 16, therewith quickly releasing the lower part of the filter cake 16 from the pressure chamber 15 in a simple fashion. The filter cake 16 is therewith released from the press chamber 15 and the chamber-defining press plates 13, 13A and will fall gravitationally from the chamber, as indicated by the position of filter cake 16 shown in the Figure. Because the movable end plate 12 is caused to move along the rails 14 until all press plates 13 are separated from one another to the extent permitted by the chains or other pulling devices attached to the two coupling devices 19 on each press plate 13, i.e. on each side edge of respective press plates 13, each press chamber 15 will empty in a simple and effective fashion without risk of the filter cake 16 between respective press plates 13 becoming compacted or forming "bridges" in the press chambers.

Figure 2A:
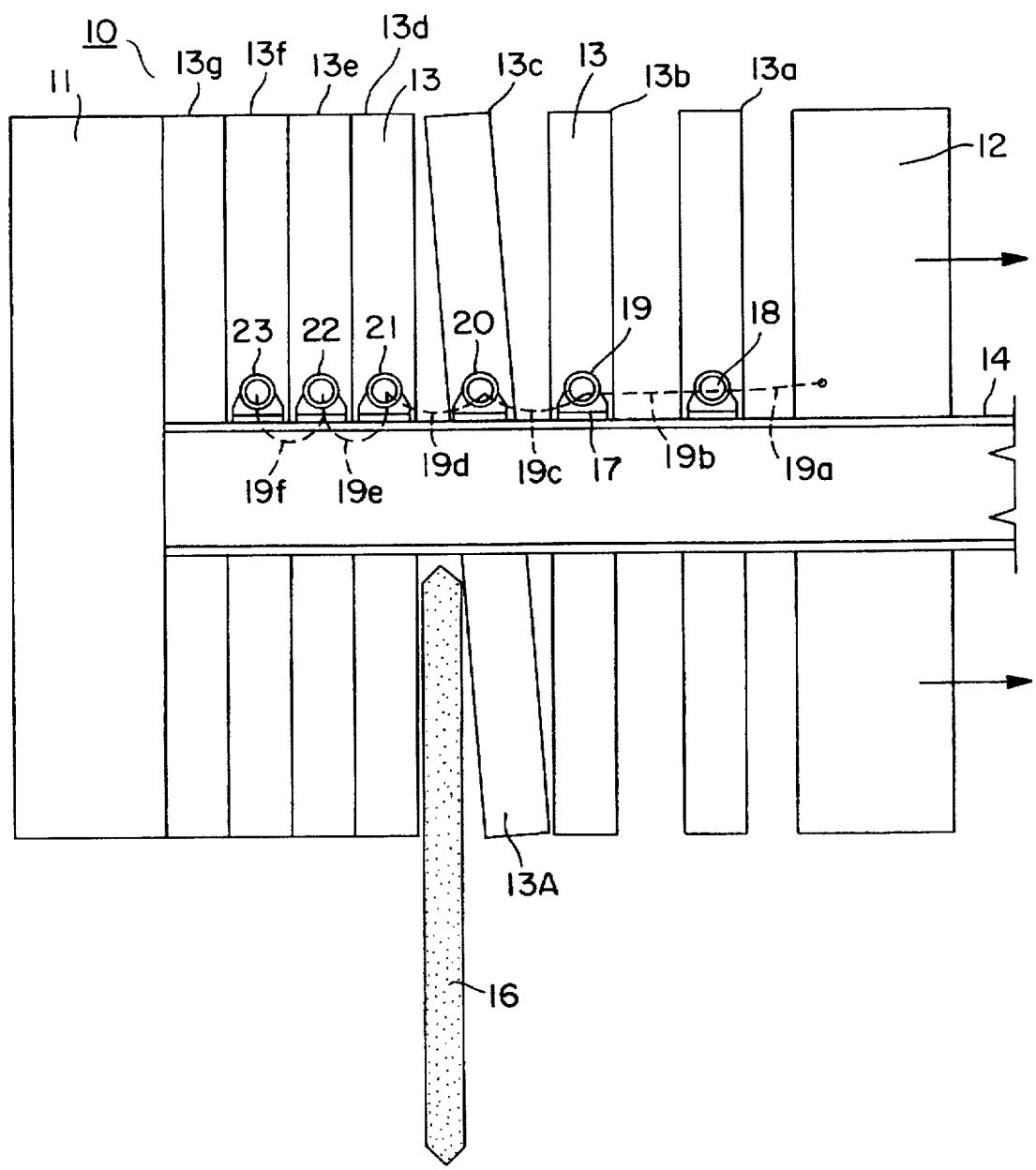
FIG. 2a illustrates a chain attached to the coupling devices.

FIG. 2a illustrates a pulling device in the form of a chain. The chain is a system of links, 19a, 19b, 19c, 19d, 19e, 19f, attached to each coupling device 19, 20, 21, 22, 23. The links 19a, 19b, 19c, 19d, 19e, 19f run from one coupling device 19 to the next coupling device 20 to the next coupling device 21 to the next coupling device 22, and so on . . . . As the end plate 12 moves to the right, the chain link 19a becomes taut and therefore moves press plate 13a to the right and that action pulls chain link 19b. As chain link 19b becomes taut, it pulls on the coupling device 19, which moves press plate 13b to the right, thereby pulling on coupling device 20. When coupling device 20 is pulled upon, press plates 13c and 13d are separated, causing the filter cake 16 to drop off. Note that in this figure, press plates 13d, 13e, 13f, and 13g are in the closed position in relation to one another.

Figure 2B:
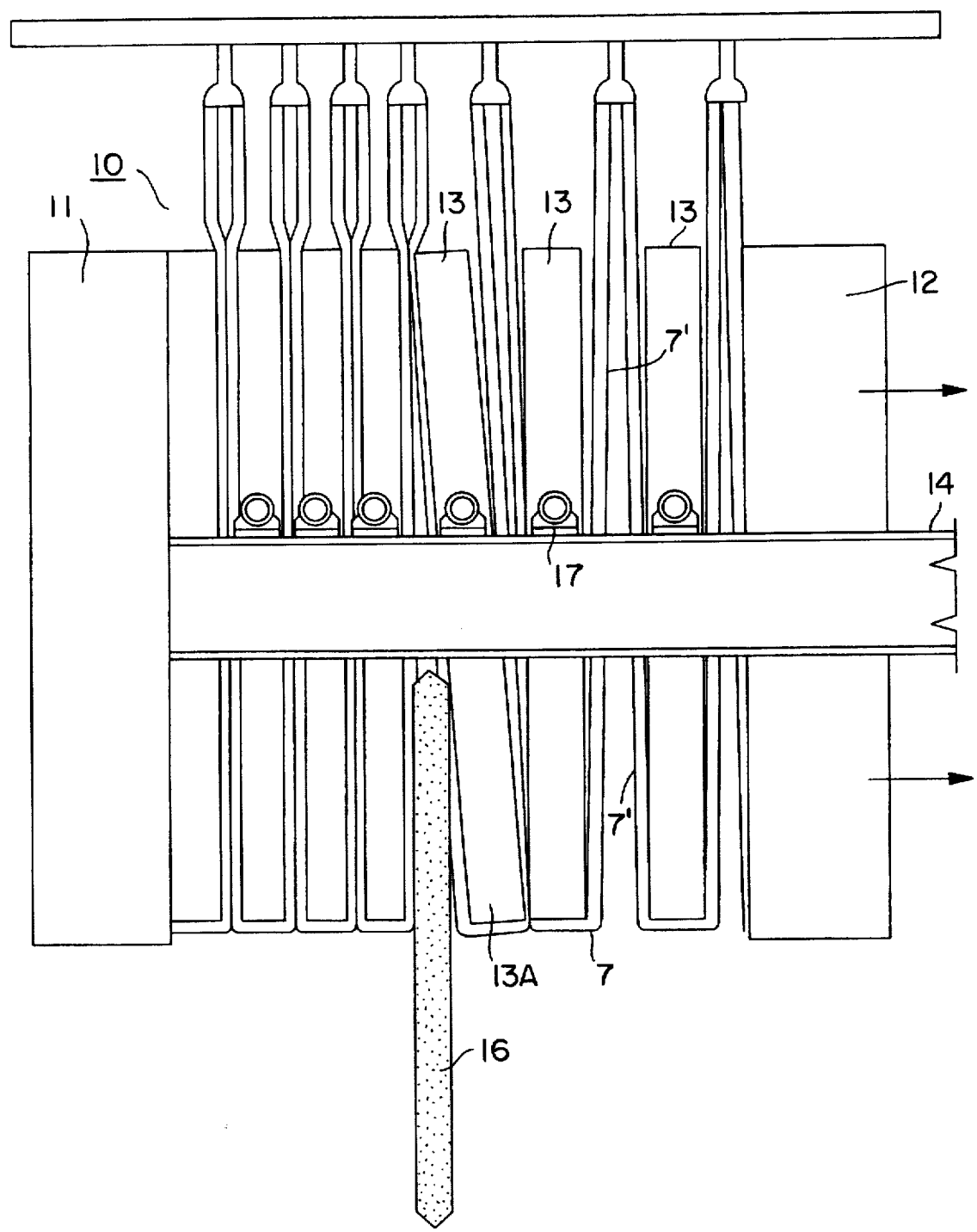
FIG. 2b illustrates a filter sheet or web between the press plates of a press filter.

FIG. 2b illustrates flexible filter sheet means, such as discussed in U.S. Pat. No. 3,289,844. The flexible filter sheet means can be formed by an elongated web 7 placed between each of the adjacent press plates 13. The flexible filter sheet means or web 7 preferably extends around the lower portion of each press plate 13. Above the upper portion of the press plates 13, the web 7 extends in the form of a loop between and above the upper portions of the adjacent press plates 13. When the press plates 13 are moved from the closed position to the open position, the portions of the filter sheet 7' assume positions inclined to each other and possibly inclined to the surfaces of the plates 13 which form the pressure chambers 15. This assures detachment of the filter cake 16 which is forming between each pair of opposite filter sheet parts 7'.

The present invention enables the chain length of the pulling devices between two press plates 13, i.e. the length that determines the distance between the press plates, to be considerably shortened, therewith enabling the number of press chambers to be greatly increased per unit length of filter. The invention thus enables productivity to be considerably increased with regard to the amount of product dewatered with each filter with other filter data remaining unchanged, partly because the number of press plates or press chambers can be increased by at least 10–15% and partly because the risk of operational disturbances caused by blockaging (formation of "bridges") is greatly reduced. The extent to which production can be increased will depend to a large extent on the tendency of the material that is to be dewatered blocking the filter by forming "bridges" therein.

All, or substantially all, of the components and methods of the various embodiments may be used with at least one embodiment or all of the embodiments, if any, described herein.

All of the patents, patent applications, and publications recited herein, if any, are hereby incorporated by reference as if set forth in their entirety herein.

The details in the patents, patent applications, and publications may be considered to be incorporable, at applicant's option, into the claims during prosecution as further limitations in the claims to patentably distinguish any amended claims from any applied prior art.

The appended drawings, in their entirety, including all dimensions, proportions and/or shapes in at least one embodiment of the invention, are, if applicable, accurate and to scale and are hereby incorporated by reference into this specification.

The invention as described hereinabove in the context of the preferred embodiment is not to be taken as limited to all of the provided details thereof, since modifications and variations thereof may be made without departing from the spirit and scope of the invention.

What is claimed is:

1. A method of emptying a press chamber of a press filter, which press filter comprises a plurality of press plates, which press plates each comprise lower ends, which press plates can be brought into mutual abutment to form at least one press chamber between at least one pair of press plates, said method comprising the steps of:

bringing the plurality of press plates into abutment to form the at least one press chamber between the at least one pair of press plates;

supplying the at least one press chamber with a fluid;

forming at least one filter cake within the at least one press chamber;

separating the press plates from one another by a distance to permit the release of the at least one filter cake from the press plates; and pivoting each of the press plates freely about a substantially horizontal axis substantially solely as a result of a force exerted on at least one of the press plates by a weight of the filter cake.

2. The method of claim 1, wherein each of the press plates has a center of gravity, and wherein said step of pivoting the press plates freely comprises locating the horizontal axis substantially adjacent to or at the center of gravity of the press plates.

3. The method of claim 2, wherein said step of pivoting the press plates comprises locating the horizontal axis slightly above the center of gravity of the press plates.

4. The method of claim 1, wherein said step of pivoting the press plates comprises increasing the distance between the lower ends of the press plates.

5. A press filter for pressing liquid from a liquid suspension of solid particles, said press filter comprising:

a plurality of press plates;

means for bringing said plurality of press plates into mutual abutment with one another;

means for separating said plurality of press plates from one another;

said press plates being configured to form at least one press chamber between at least one pair of said plurality of press plates upon said at least one pair of press plates being brought into mutual abutment with one another;

each of said plurality of press plates comprising a first side and a second side;

means for supporting said plurality of press plates at said first and second sides of said press plates;

runner means for permitting said press plates to move along said supporting means;

said separating means comprising means for pulling each of said press plates away from one another;

said separating means comprising means for coupling said pulling means to said first side and said second side of said press plates substantially adjacent or on said runner means;

each of said press plates having a center of gravity and a substantially horizontal axis;

said runner means comprising means for pivotally mounting each of said press plates about its corresponding substantially horizontal axis; and said pivotal mounting means comprising means for mounting each of said press plates substantially adjacent or at the center of gravity of each of said press plates.

6. The press filter of claim 5, wherein said pivotal mounting means comprises means for pivotally mounting said press plates slightly above the center of gravity of the press plates.

7. The press filter of claim 6, wherein said means for coupling said pulling means comprises means for coupling said pulling means to said runner means.

8. The press filter of claim 7, wherein:

said pulling means comprises a system of links; and said coupling means comprises means for connecting said system of links to all of said press plates.

9. The press filter of claim 8, wherein said system of links comprises at least one chain.

10. The press filter of claim 9, wherein:

said supporting means comprises at least two rails;

said runner means comprises a surface for sliding along said at least two rails; and said sliding surface is configured to comprise said pivotal mounting means.

11. A press filter for pressing liquid from a liquid suspension of solid particles, said press filter comprising:

a plurality of press plates each having a lower end and a substantially horizontal axis;

means for bringing said plurality of press plates into mutual abutment with one another;

means for separating said plurality of press plates from one another;

said press plates being configured to form at least one press chamber between at least one pair of said plurality of press plates upon said at least one pair of press plates being brought into mutual abutment with one another;

means for supporting said plurality of press plates;

runner means for permitting said press plates to move along said supporting means; and said runner means comprising means for pivotally mounting each of said press plates about its corresponding substantially horizontal axis to increase the distance between the lower ends of the press plates substantially solely as a result of a force exerted on at least one of said press plates by a weight of a filter cake.

12. The press filter of claim 11, wherein;

each of said press plates has a center of gravity; and said pivotal mounting means comprises means for pivotally mounting said press plates substantially adjacent to or at the center of gravity of said press plates.

13. The press filter of claim 12, wherein said pivotal mounting means comprises means for pivotally mounting said press plates slightly above the center of gravity of said press plates.

14. The press filter of claim 13, wherein:

each of said plurality of press plates comprises a first side and a second side;

said separating means comprising means for pulling each of said press plates away from one another;

said separating means comprises means for coupling said pulling means to said first side and said second side of said press plates substantially adjacent to or on said runner means;

said pulling means comprise a system of links; and said coupling means comprises means for connecting said system of links to all of said press plates.

15. The press filter of claim 14, wherein said system of links comprises at least one chain.

16. The press filter of claim 15, wherein said supporting means comprises at least two rails.

17. The press filter of claim 16, wherein said runner means comprises said means for coupling.

* * * * *